United States Patent [19]

Alderton

[11] 4,289,059
[45] Sep. 15, 1981

[54] HOOK BOLT ADAPTER

[75] Inventor: Gordon H. S. Alderton, Bingley, England

[73] Assignee: Henry Lindsay Limited, Shipley, England

[21] Appl. No.: 57,755

[22] Filed: Jul. 16, 1979

[30] Foreign Application Priority Data

Jul. 24, 1978 [GB] United Kingdom ............... 30901/78
Oct. 16, 1978 [GB] United Kingdom ............... 40654/78

[51] Int. Cl.³ ............................................. F16B 43/02
[52] U.S. Cl. ................................... 411/531; 238/338; 411/371; 411/400
[58] Field of Search .................. 85/50 R, 29, 28, 9 R, 85/50 C, 83; 151/35, 37, 38, 54, 44, 60; 248/228; 403/406; 238/338, 355, 358

[56] References Cited

U.S. PATENT DOCUMENTS

| 244,793 | 7/1881 | Bulcroft et al. | 151/54 X |
|---|---|---|---|
| 264,626 | 9/1882 | Clark | 151/38 |
| 915,376 | 3/1909 | Pfautz et al. | 238/338 |
| 1,136,638 | 4/1915 | Zifferer | 85/83 |
| 1,510,339 | 9/1924 | Osborn | 238/338 X |
| 1,570,390 | 1/1926 | Muller | 238/338 X |
| 2,161,259 | 6/1939 | Lindsay | 403/406 |
| 2,210,249 | 8/1940 | Lindsay | 403/406 |

Primary Examiner—Ramon S. Britts
Attorney, Agent, or Firm—Browdy and Neimark

[57] ABSTRACT

An adapter which converts a bolt into a hookbolt has a nose portion and a tail portion diametrically opposed with respect to the stem of the bolt. The nose portion has an engagement surface which curves upwardly away from a flange to which the bolt is to be hooked, and parallel ribs are provided on the engagement surface which extend outwardly away from the stem of the bolt. The ribs are deformable so as to compensate for irregularities in the surface of the flange.

9 Claims, 19 Drawing Figures

U.S. Patent    Sep. 15, 1981    Sheet 1 of 3    4,289,059
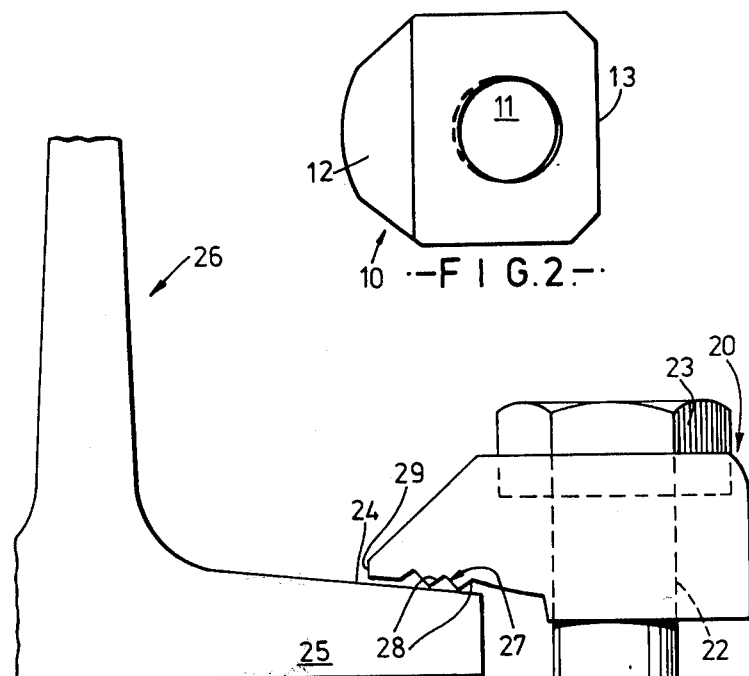
FIG.2.
FIG.1.
PRIOR ART
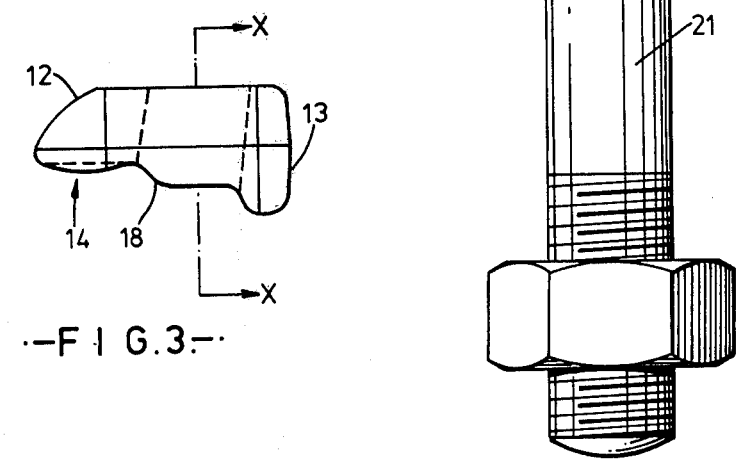
FIG.3.

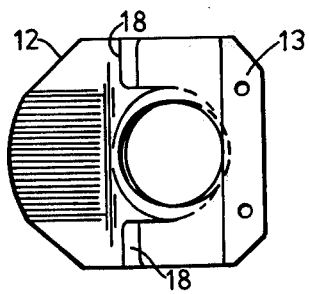
-F I G.4.-
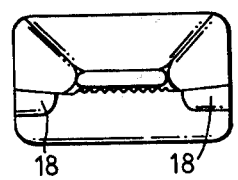
-F I G.5.-
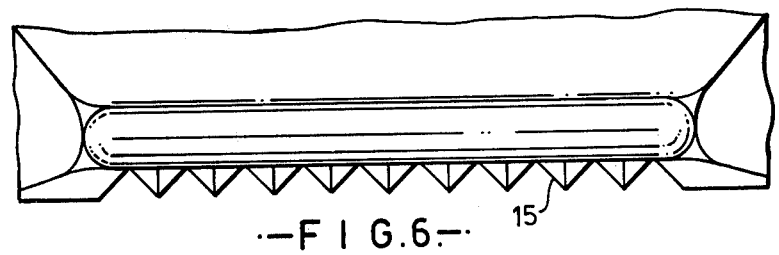
-F I G.6.-
-F I G.7.-
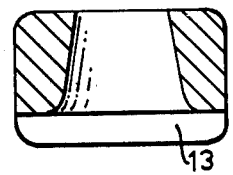
-F I G.8.-
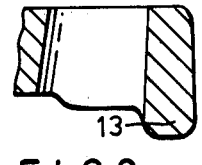
-F I G.9.-
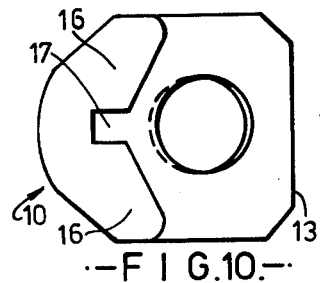
-F I G.10.-
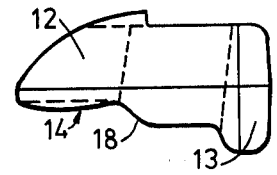
-F I G.11.-

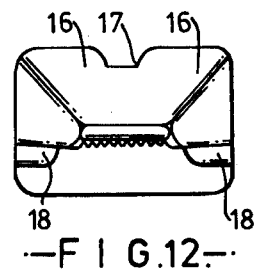
—F I G.12—
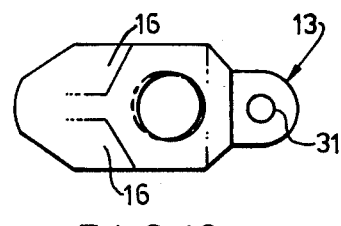
—F I G.13.—
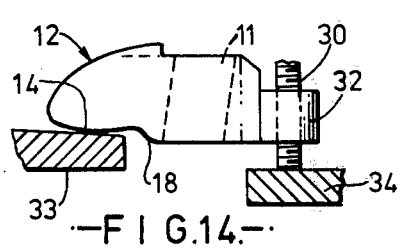
—F I G.14.—
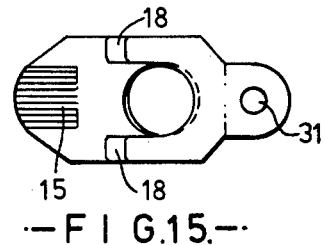
—F I G.15.—
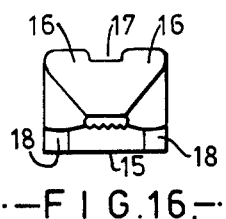
—F I G.16.—
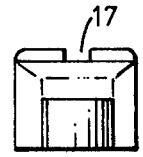
—F I G.17.—
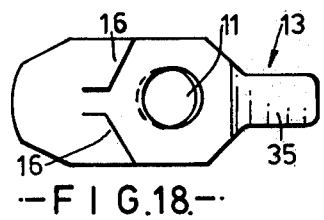
—F I G.18.—
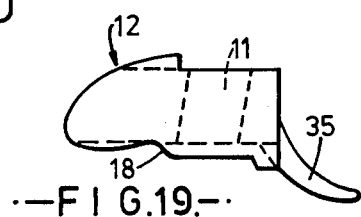
—F I G.19.—

HOOK BOLT ADAPTER

This invention relates to an adapter for use with a bolt in order to convert the latter into a hook bolt.

Hook bolts, and bolts converted into hook bolts by adapters, have many uses in the construction industry in the assembly of components e.g. to suspend a component from a beam, and are particularly advantageous in that the bolt is able to engage on a flange by its "hook", and there is no necessity to involve the labour costs, and the weakening and corrosion-creating effect, of drilling a hole in the flange to take the bolt. The use of adapters, e.g. as supplied under the Trade Name "Lindapter" (Registered Trade Mark) is particularly advantageous since they can be used with standard size bolts with evident advantages as to convenience and total cost.

The present invention has been developed primarily with a view to improving the operating function of adapters in a number of aspects.

According to the invention there is provided an adapter for use with a bolt in order to convert the latter into a hookbolt by cooperating with a head of the bolt, the adapter defining a passage through which the stem of the bolt can be taken, in which the adapter comprises:

a nose portion which projects laterally of the passage to form a hook for the bolt in use of the adapter, said nose portion having an engagement surface which extends away from the stem of the bolt and which faces in the direction from the head of the bolt and along the stem of the bolt to engage the surface of a flange or the like to which the bolt is to be hooked in use;

in which said engagement surface is curved with a centre or centres of curvature spaced from said surface in a direction opposite to said first mentioned direction, and is provided with ribs which extend parallel to each other away from the stem of the bolt;

and in which said ribs are made to be deformable so that the engagement surface as a whole can adjust its surface shape to correspond with any irregularities which may be present in the surface of the flange which it engages in use.

By providing a curved engagement surface, the adapter can be used with flanges which have parallel surfaces or tapered surfaces; in the latter case the adapter can rock slightly backward or forward depending on how steep or shallow is the slope on the flange. By providing the deformable, parallel ribs (which extend along the circumference of the curved engagement surface), the adapter can operate more effectively via the curved engagement surface, on tapered or parallel flanges, even when surface irregularities are present in the surface of the flange engaged by the nose portion. Evidently, the ribs will be made to be deformable relative to the flange surface.

Conveniently, the ribs may be made deformable by forming them of malleable iron, or the entire adapter may be cast in malleable iron.

Preferably, the passage in the adapter for the bolt stem has a circular cross-section throughout in order to avoid stress-concentration regions which would be present in use with other configurations such as square cross-sections. In a known construction of adapter having a square cross-section passage for the bolt, the passage is generally formed to be over-size relative to the bolt for which it is designed, but diametrically opposed contact regions are provided which are spaced-apart more exactly to the bolt diameter in order to provide play-free holding of the bolt. However, this has the disadvantage, in certain cases, of undue stress concentration which may result in premature failure of the adapter and/or the bolt. By providing, as is preferred, circular cross-section passage throughout the adapter for the bolt, the passage can be dimensioned more closely to the diameter of the bolt, so that a more uniform distribution of stress can be obtained throughout the interengaging contact surfaces.

The adapter may also have a tail-portion which is diametrically opposed to the nose portion and which projects generally in the direction of the bolt stem to engage, when required, an adjacent support surface.

In order to minimise the load stress transferred to the support surface e.g. a wooden or concrete fixing, it is preferred that the tail portion has a substantial width and preferably equal to the width of the adapter as a whole. Also, this will enable the adapter to be used with slotted constructions, which has not been possible with the known adapter, in that the widened tail is able to bridge-over a slot in the slotted construction.

In order to provide a construction of adapter which can hold captive a bolt head, the body of the adapter (forming the nose and tail portions and the passage) may be provided in its upper surface, adjacent the entrance to the passage, with a projecting portion which can hold against rotation two adjacent flats of a bolt head. The projecting portion may comprise two inclined shoulder portions, preferably separated by a slot in which the apex of two adjacent flats of the bolt head can be received. The provision of the slot facilitates manufacture since (a) less material is used, (b) it is easier to cast and (c) less precision is required.

Thus, two different types of adapter can be readily provided, which can have the same design load characteristics, the types differing only by the presence of the projecting portion on one of the types to render the bolt head captive.

In order to enable the adapter to be adjusted so as to compensate for different thicknesses of flange onto which the adapter is to be "hooked", adjustment means may be provided on the tail portion. The adjustment means may comprise a threaded adjustment member, such as a grub screw, which can be adjusted in order to maintain the required attitute of the adapter relative to the particular flange which it engages.

Four embodiments of adapter according to the invention will now be described in detail, by way of example only, with reference to the accompanying drawings in which:

FIG. 1 is a side view of a known construction of hook bolt adapter;

FIG. 2 is a plan view of a first embodiment of adapter according to the invention;

FIG. 3 is a side view of the first embodiment;

FIG. 4 is an under plan view of the first embodiment;

FIG. 5 is an end view of the first embodiment;

FIG. 6 is an enlarged end view of a detail of the first embodiment;

FIG. 7 is a detailed view of a nose portion of the first embodiment;

FIG. 8 is a sectional view taken on the line XX in FIG. 3;

FIG. 9 is a detailed view of a tail portion of the first embodiment;

FIG. 10 is a plan view of a second embodiment of adapter;

FIG. 11 is a side view of the second embodiment;

FIG. 12 is an end view of the second embodiment;

FIG. 13 is a plan view of a third embodiment of adapter;

FIG. 14 is a side view of the third embodiment;

FIG. 15 is an under plan view of the third embodiment;

FIG. 16 is a view from one end of the third embodiment;

FIG. 17 is a view from the opposite end of the third embodiment;

FIG. 18 is a plan view of a fourth embodiment of the adapter; and

FIG. 19 is a side view of the fourth embodiment.

Referring first to FIG. 1 of the drawings, a known construction of hook bolt adapter 20 is illustrated, the adapter 20 being assembled with a standard bolt having a stem 21 which is taken through a square cross-section passage 22 formed in the adapter 20, and a head 23 which is partly received in a counter-sunk recess provided in the adapter 20.

The adapter 20, when assembled with the bolt, converts the bolt into a hook bolt, and the assembly is illustrated in FIG. 1 with the adapter 20 constituting the "hook" of the bolt and in engagement on the surface 24 of a flange 25 which, by way of example only, comprises the flange of an I-beam 26. The adapter 20 has an engagement surface 27 by which the adapter 20 engages the surface 24, and it will be noted that the surface 27 constitutes a substantially flat surface provided with projecting ribs 28. The ribs 28 are parallel ribs which extend generally parallel to the longitudinal axis of the flange 25 i.e. the ribs 28 extend substantially perpendicular to a radial line extending from the centre of the stem 21 to the outermost periphery 29 of the surface 27.

Referring now to FIGS. 2 to 9 of the drawings, there is shown a first embodiment of adapter according to the invention which may be used with a bolt in order to convert the latter into a hook bolt in generally similar manner to the known construction described above with reference to FIG. 1. Accordingly, a bolt to cooperate with the adapter has been omitted from FIGS. 2 to 9. The first embodiment of adapter is designated generally by reference numeral 10 and comprises a body which defines a passage 11 for the stem of a bolt, and has a nose portion 12 and a tail portion 13. The nose portion 12 is intended to engage over, and onto the surface of a flange (not shown) to which a component (not shown) is to be secured. The nose portion 12 has an engagement surface 14 and, when the adapter 10 is combined with a bolt (not shown), the nose portion 12 forms a hook for the bolt. As will be seen particularly in FIGS. 2 and 7, the engagement surface 14 is curved, having a center, or centers of curvature spaced from the curved surface in a direction opposite to the direction from the head of the bolt along the stem thereof.

As will be seen particularly in FIG. 6 of the drawings, the engagement surface 14, in addition to being curved, is provided with a number of parallel ribs 15 which extend outwardly away from the passage 11 and along the circumference of the curved surface of engagement surface 14. At least the ribs 15 are made of deformable material so that they can deform under load so as to adapt the engagement surface 14 as a whole to any irregularities which may be present in the surface of a flange engaged by the nose portion 12.

The nose portion 12, by virtue of its curved engagement surface 14, is able to make satisfactory engagement with the surface of a flange having parallel sides, or tapered sides, and in the latter case the adapter would be able to rock to a limited extent on the curved engagement surface 14 by an amount depending upon the slope of the tapered surfaces.

Conveniently, the ribs 15 are made of a suitable deformable material such as malleable iron, which, when the adapter is used with metal beams used in the construction industry, is deformable relative thereto. Conveniently, the entire adapter 10 is cast in malleable iron.

The tail portion 13 is located diametrically opposite with respect to the nose portion 12, and serves, when required, to react from a support surface (not shown). In order to minimise the load stress applied to the support surface, the tail portion 13 has, as will be seen in FIG. 4, a width substantially equal to the width of the adapter 10 as a whole.

As will be seen from FIGS. 2 and 4, the passage 11 has a circular cross-section throughout its length, and this ensures that stress-concentration regions are avoided, which would otherwise be present with other configurations such as square cross-sections.

Referring now to FIGS. 10 to 12, a second embodiment of adapter according to the invention is shown, this embodiment being substantially similar to the first embodiment, but having an additional feature to enable the head of a bolt to be rendered captive. Corresponding parts are designated by the same reference numerals and will not be described in detail again.

In order to render the head of a bolt captive, the body of the adapter has a projecting portion which forms two inclined shoulders 16 which can engage two adjacent flanks of the head of a bolt. As will be seen from FIGS. 10 and 12, a slot 17 is defined between the shoulders 16, and the apex of two adjacent flanks of a bolt head will be received in the slot 17. The provision of the slot 17 has a number of advantages, namely, (a) less material is used in manufacture, (b) it is easier to cast and (c) less precision is required in manufacture while providing a satisfactory construction to accommodate two of the flanks of a bolt head, since it is not necessary to provide a precisely shaped corner to receive an apex of a bolt head.

The modified embodiment of FIGS. 10 to 12 will have substantially similar design load characteristics to the first embodiment shown in FIGS. 2 to 9, and only differs in so far as it provides a facility for rendering the bolt head captive.

In both embodiments of the invention, the adapter is provided with abutment means, adjacent to the nose portion, which can engage the edge of a flange in order to oppose any tendency for the adapter to rotate during tightening of a bolt taken through the adapter, which could result in disengagement of the nose portion 12 from the surface of a flange which it engages. The abutment means comprises a depending skirt which is rounded and blends into the contour of the engagement surface 14, and which is constituted by a pair of rounded steps 18.

Referring now to FIGS. 13 to 17 of the drawings, a third embodiment of adapter is illustrated which is similar, in many respects to some of the parts of the first and second embodiments, and corresponding parts are designated by the same reference numerals, and will not be described in detail again.

The third embodiment is provided with adjustment means to enable the adapter to be adjusted so as to compensate for different thicknesses of flange onto which the adapter is to be "hooked". Thus, having regard to the tail portions of the first embodiments, the height of the tail portions 13 will determine the height of the flange which can be engaged satisfactorily with the surface 14 of the nose portion 12. Although not shown in FIGS. 2 to 12, in some modes of use of the adapter, the tail portion 13 will engage with a suitable support surface.

The adjustment means provided for the third embodiment enables the adapter to be used with flanges of a height in a range of sizes. The adjustment means comprises a threaded member such as a grub screw 30 which is taken through a threaded bore 31 formed in a flange 32 of the adapter. As illustrated in FIG. 14, the curved engagement surface 14 of the nose portion 12 engages downwardly on the surface of a flange 33, whereas the flange 32 is supported by a support 34 via the lower end of the grub screw 30. Evidently, the grub screw 30 can be adjusted in order to maintain the required attitude of the adapter relative to the flange 33. To maintain the same attitude of the adapter relative to a flange of a different thickness, it is only necessary to make appropriate adjustment of the grub screw 30.

It is known per se to provide an adjustment means of the above described type in a hookbolt adapter of the type shown in FIG. 1. However, such an adjustment means has not been proposed in connection with a curved engagement surface 14 having the deformable and outwardly extending ribs 15.

Referring now to FIGS. 18 and 19, the fourth embodiment of adapter has a similar function to the third embodiment, and parts which correspond with the other embodiments are designated by the same reference numerals, and will not be described in detail again.

The fourth embodiment differs from the third embodiment, in that the tail portion 13 is constituted by a deformable lug 35 which is able to deform upwardly so as to compensate for any difference in height between a support (not shown) engaged by the nose portion 12 and a support (not shown) engaged by the tail portion 13.

I claim:

1. An adapter for use with a bolt in order to convert the latter into a hookbolt by cooperating with a head of the bolt, the adapter defining a passage through which the stem of the bolt can be taken, in which the adapter comprises:

a nose portion which projects laterally of the passage to form a hook for the bolt in use of the adapter;

an engagement surface provided on the nose portion which extends away from the stem of the bolt and which faces in the direction from the head of the bolt and along the stem of the bolt to engage the surface of a flange to which the bolt is to be hooked in use, the engagement surface being curved with a centre or centres of curvature spaced from said surface in a direction opposite to said first mentioned direction;

and ribs provided on said engagement surface and extending parallel to each other away from the stem of the bolt, said ribs being made to be deformable so that the engagement surface as a whole can adjust its surface shape to correspond with any irregularities which may be present in the surface of the flange which it engages in use.

2. An adapter according to claim 1, in which at least said ribs are made of malleable iron.

3. An adapter according to claim 1, in which said passage in the adapter has a circular cross-section throughout its length.

4. An adapter according to claim 1, in which a tail portion is provided on the adapter and is diametrically opposed to said nose portion.

5. An adapter according to claim 4, in which the width of said tail portion is equal to the width of the adapter as a whole.

6. An adapter according to claim 1, in which a projecting portion is provided on the adapter adjacent the entrance to said passage and comprises two inclined shoulder portions separated by a slot in which the apex of two adjacent flats of the bolt head can be received.

7. An adapter according to claim 1, in which abutment means is provided to engage the edge of a flange in order to oppose any tendency for the adapter to rotate during tightening of a bolt taken through the adapter.

8. An adapter according to claim 4, in which said tail portion is provided with adjustment means which enables the adapter to be used with flanges of different thicknesses.

9. An adapter according to claim 4, in which said tail portion is constituted by a deformable lug.

* * * * *